(12) United States Patent
Iyama et al.

(10) Patent No.: US 11,837,145 B2
(45) Date of Patent: Dec. 5, 2023

(54) DISPLAY APPARATUS AND DISPLAY CONTROL APPARATUS

(71) Applicant: SONY SEMICONDUCTOR SOLUTIONS CORPORATION, Kanagawa (JP)

(72) Inventors: Takayuki Iyama, Kanagawa (JP); Hiroyuki Ozawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 159 days.

(21) Appl. No.: 17/309,357

(22) PCT Filed: Oct. 18, 2019

(86) PCT No.: PCT/JP2019/041044
§ 371 (c)(1),
(2) Date: May 20, 2021

(87) PCT Pub. No.: WO2020/110506
PCT Pub. Date: Jun. 4, 2020

(65) Prior Publication Data
US 2022/0020312 A1 Jan. 20, 2022

(30) Foreign Application Priority Data

Nov. 28, 2018 (JP) .................... 2018-222345

(51) Int. Cl.
*G09G 3/20* (2006.01)
*G06T 7/20* (2017.01)
*G06T 19/00* (2011.01)

(52) U.S. Cl.
CPC ............ *G09G 3/2092* (2013.01); *G06T 7/20* (2013.01); *G09G 2340/0478* (2013.01); *G09G 2340/125* (2013.01)

(58) Field of Classification Search
CPC ................. G06T 19/006; G06T 7/20
See application file for complete search history.

(56) References Cited

U.S. PATENT DOCUMENTS 5,870,074 A 2/1999 Iwasaki
6,411,377 B1 * 6/2002 Noguchi ............... H01J 37/00
356/237.4

(Continued)

FOREIGN PATENT DOCUMENTS

CN 105229719 A 1/2016
CN 107003512 A 8/2017

(Continued)

OTHER PUBLICATIONS

International Search Report and Written Opinion of PCT Application No. PCT/JP2019/041044, dated Dec. 24, 2019, 10 pages of ISRWO.

*Primary Examiner* — Yi Yang
(74) *Attorney, Agent, or Firm* — CHIP LAW GROUP

(57) ABSTRACT

Provided is a display apparatus that superimposes an image on an observation target, and the display apparatus includes a display unit and a display controller. The display unit displays an object image. The display controller adjusts a display position of the object image in a display region of the display unit in a horizontal direction on a pixel line basis.

9 Claims, 7 Drawing Sheets

(56) References Cited

U.S. PATENT DOCUMENTS

| | | | | |
|---|---|---|---|---|
| 2002/0191199 | A1* | 12/2002 | Imada | G06F 3/1288 |
| | | | | 358/1.1 |
| 2014/0267420 | A1* | 9/2014 | Schowengerdt | G06F 3/013 |
| | | | | 345/633 |
| 2016/0063713 | A1* | 3/2016 | Okamoto | G06T 3/604 |
| | | | | 345/419 |
| 2016/0109957 | A1* | 4/2016 | Takashima | G06F 3/0425 |
| | | | | 345/8 |
| 2016/0189429 | A1 | 6/2016 | Mallinson et al. | |
| 2018/0315364 | A1 | 11/2018 | Yamamoto et al. | |
| 2019/0082089 | A1 | 3/2019 | Shiohara | |

FOREIGN PATENT DOCUMENTS

| | | |
|---|---|---|
| CN | 108292489 A | 7/2018 |
| EP | 3379525 A1 | 9/2018 |
| JP | 9-138683 A | 5/1997 |
| JP | 2016-520891 A | 7/2016 |
| JP | 2016-208380 A | 12/2016 |
| JP | 2017176453 | 9/2017 |
| JP | 2018-503114 A | 2/2018 |
| JP | 2019-054360 A | 4/2019 |
| KR | 10-2015-0130555 A | 11/2015 |
| WO | 2017/086263 A1 | 5/2017 |

\* cited by examiner

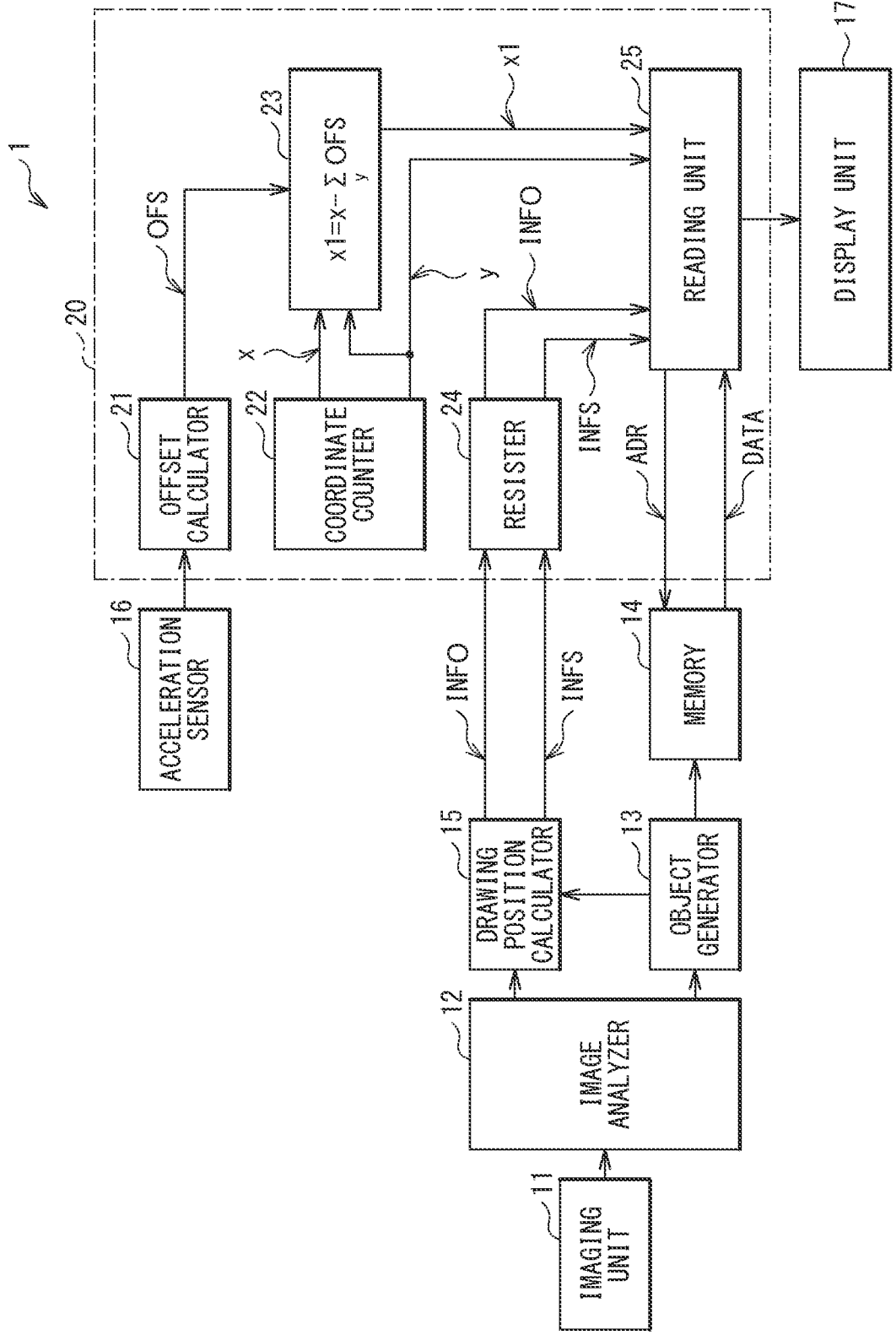
[FIG. 1]

[FIG. 2]
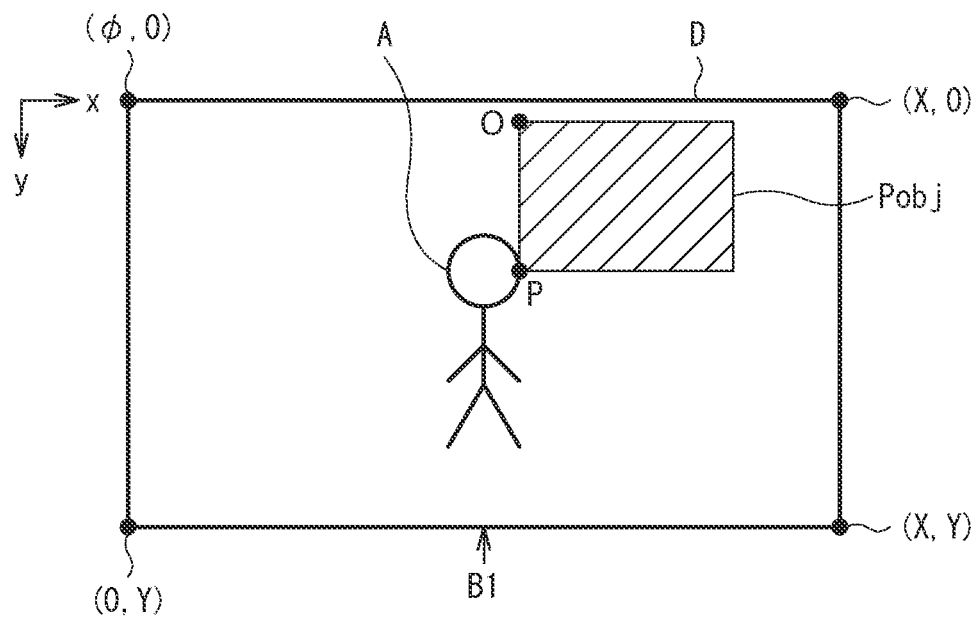
[FIG. 3]
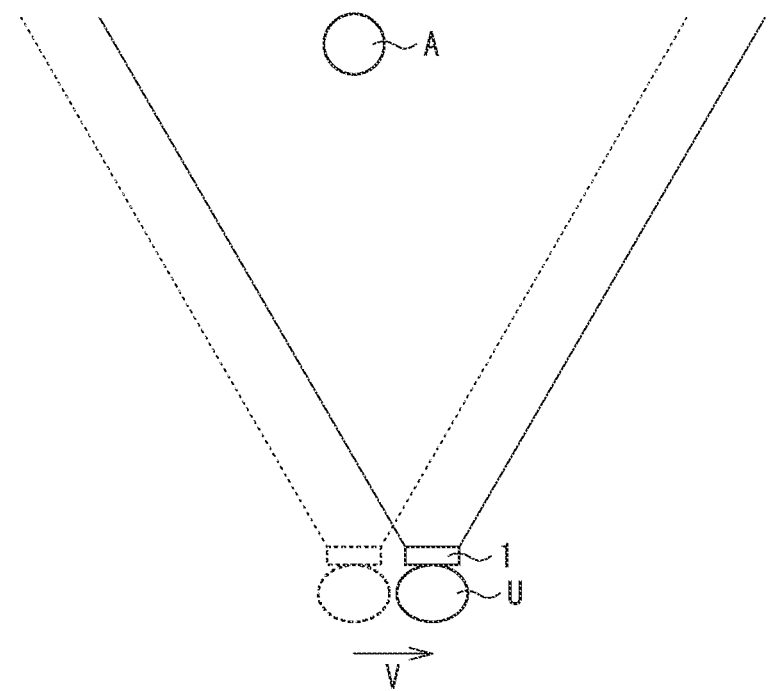

[ FIG. 4 ]
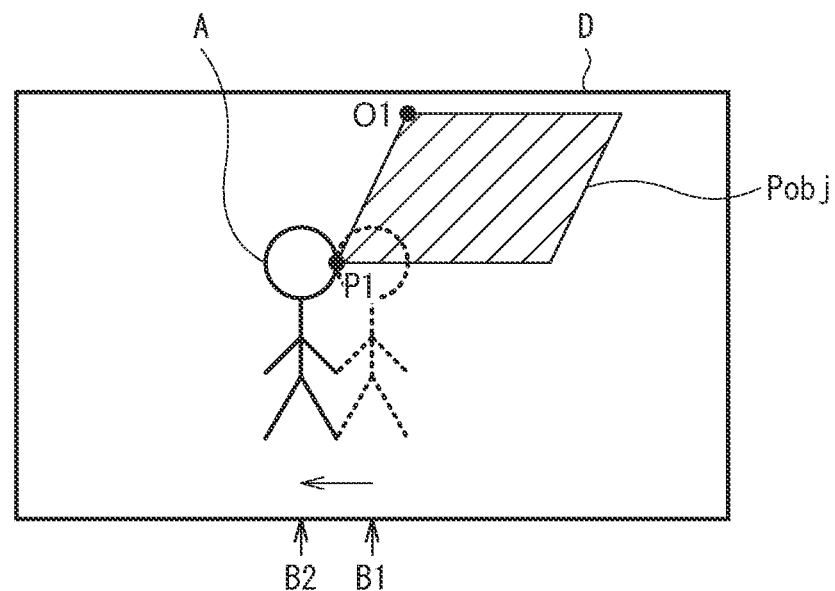
[ FIG. 5 ]
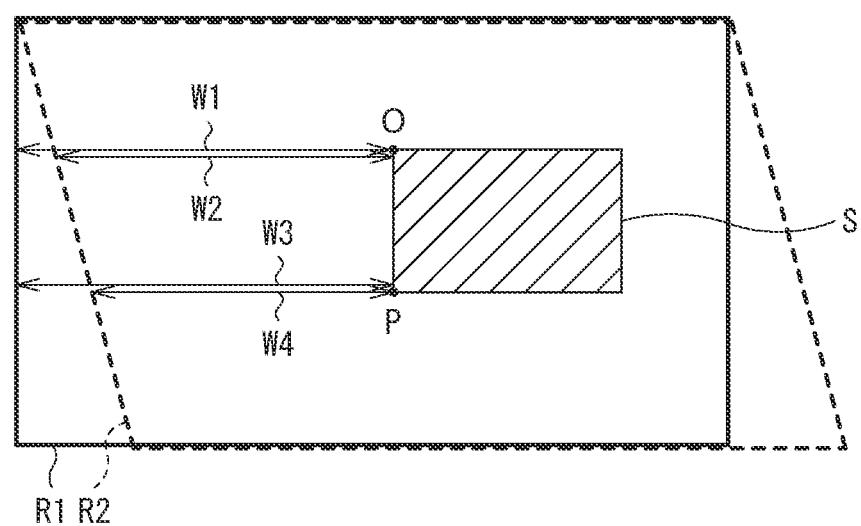

[ FIG. 6 ]
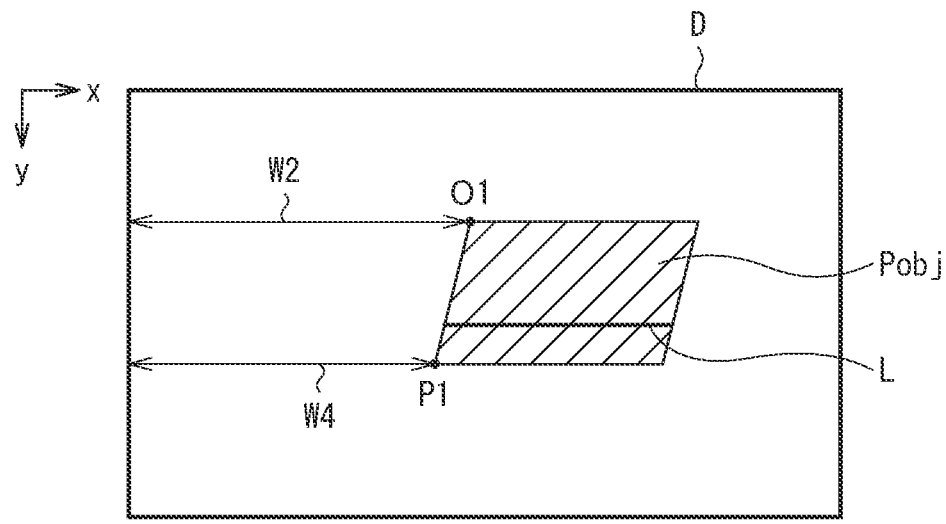
[ FIG. 7 ]
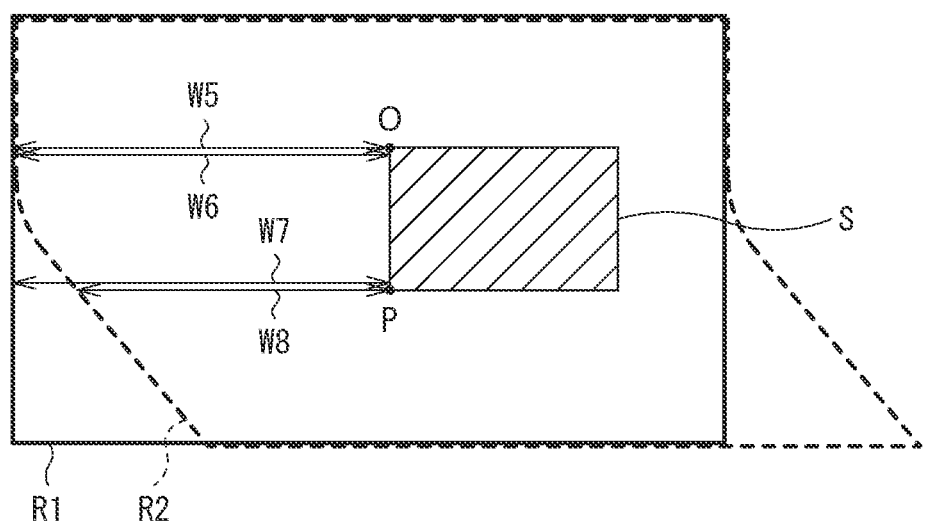

[ FIG. 8 ]
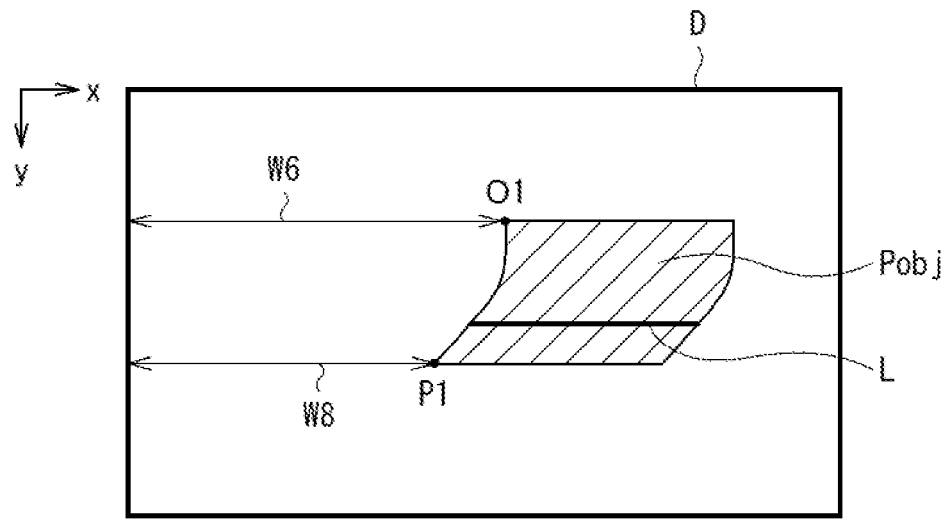
[ FIG. 9 ]
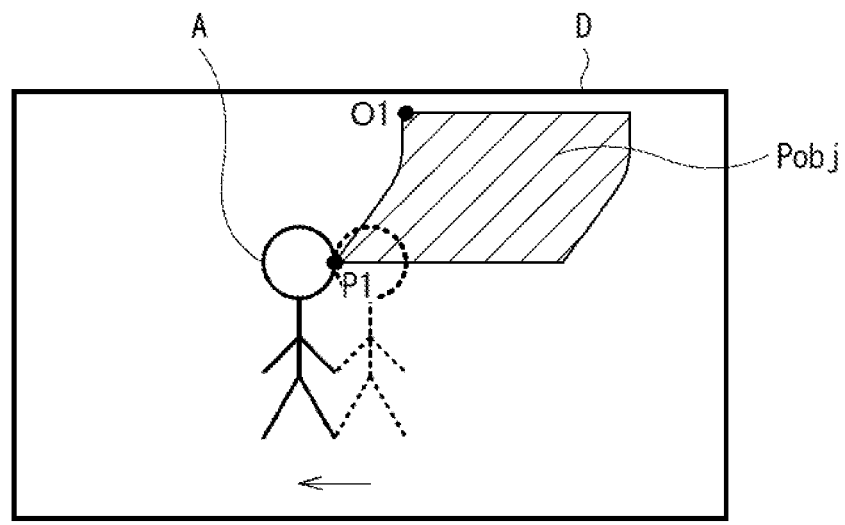

[ FIG. 10 ]
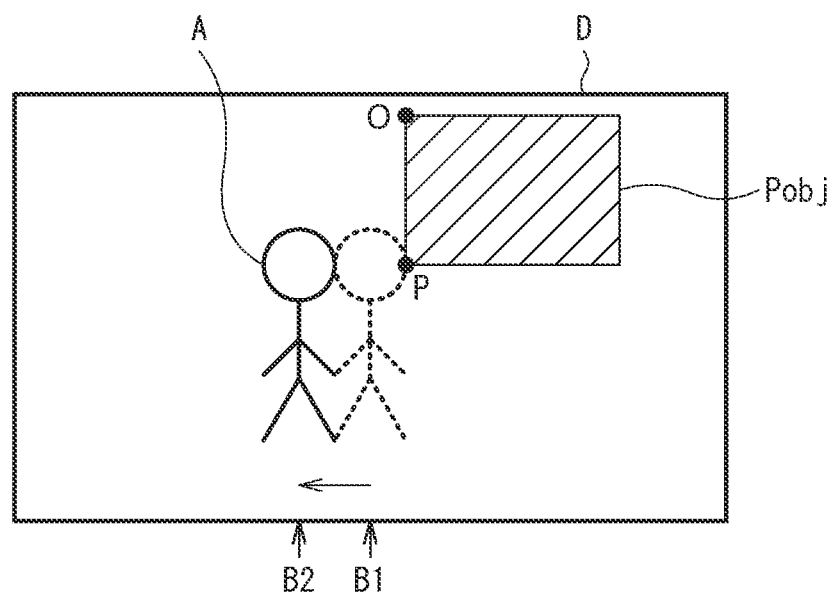

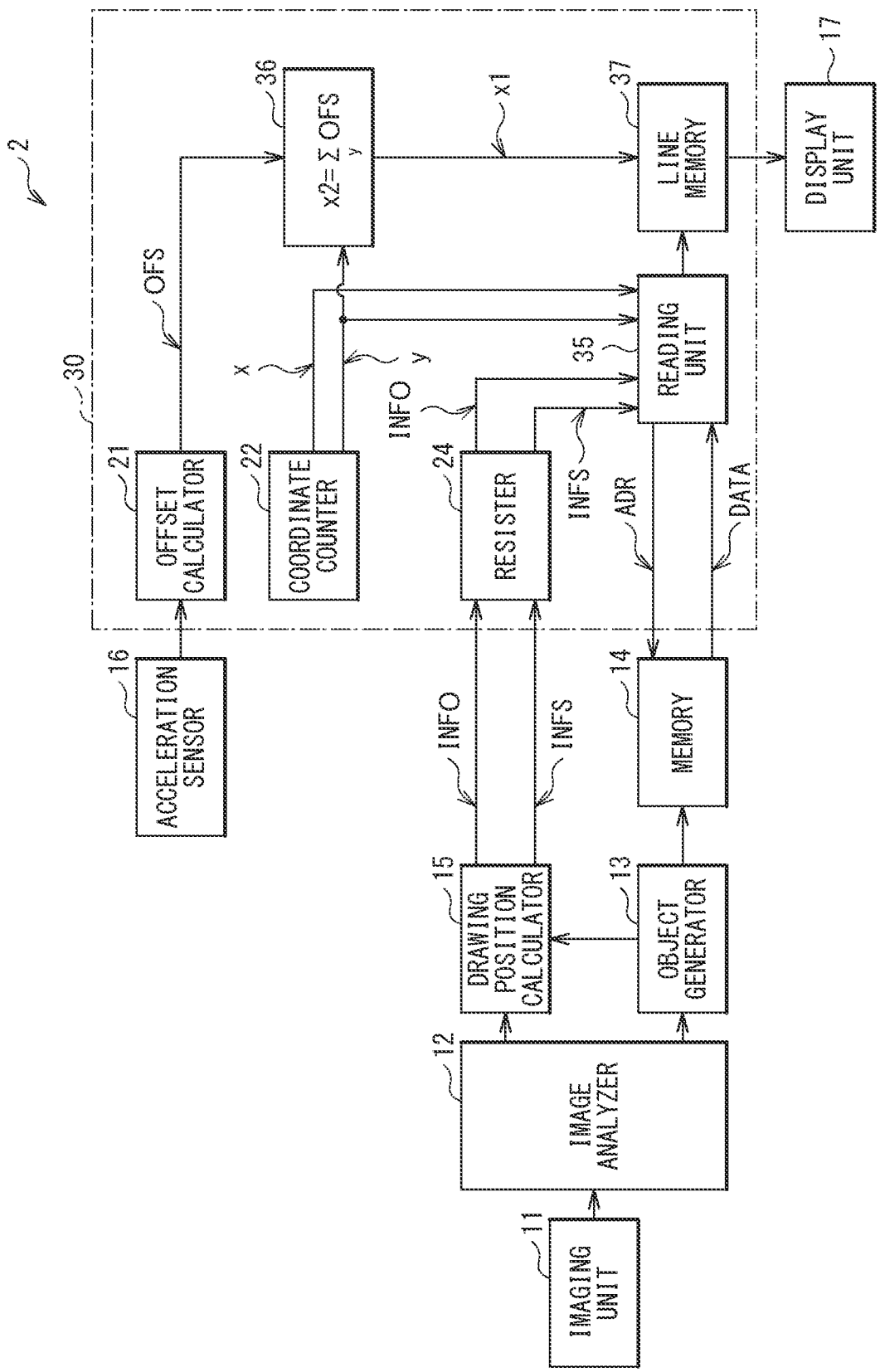
[FIG. 11]

DISPLAY APPARATUS AND DISPLAY CONTROL APPARATUS

CROSS REFERENCE TO RELATED APPLICATIONS

This application is a U.S. National Phase of International Patent Application No. PCT/JP2019/041044 filed on Oct. 18, 2019, which claims priority benefit of Japanese Patent Application No. JP 2018-222345 filed in the Japan Patent Office on Nov. 28, 2018. Each of the above-referenced applications is hereby incorporated herein by reference in its entirety.

TECHNICAL FIELD

The present disclosure relates to a display apparatus that displays images and a display control apparatus used in such a display apparatus.

BACKGROUND ART

A display apparatus that implements augmented reality (AR) superimposes an image on an observation target such as an object or a person in the real space (refer to Patent Literature 1, for example)

CITATION LIST

Patent Literature

PTL 1: Japanese Unexamined Patent Application Publication No. 2016-208380

SUMMARY OF THE INVENTION

Incidentally, in such a display apparatus, it is desired to reduce the possibility of making a user feel uncomfortable, and it is expected to reduce the uncomfortable feeling.

It is desirable to provide a display apparatus and a display control apparatus that make it possible to reduce the possibility of making a user feel uncomfortable.

A display apparatus according to one embodiment of the present disclosure includes a display unit and a display controller. The display unit is configured to superimpose an image on an observation target and to display an object image. The display controller is configured to adjust a display position of the object image in a display region of the display unit in a horizontal direction on a pixel line basis. Herein, the term "display apparatus" is not limited to a display device having only a display function, and includes an electronic device having such a display device.

A display control apparatus according to one embodiment of the present disclosure includes a display controller configured to adjust a display position of an object image displayed in a display region of a display unit in a horizontal direction on a pixel line basis, the display unit being configured to superimpose an image on an observation target.

In the display apparatus and the display control apparatus according to one embodiment of the present disclosure, the display unit is configured to superimpose an image on an observation target. The display position of an object image displayed in a display region of the display unit is adjusted in a horizontal direction on a pixel line basis.

BRIEF DESCRIPTION OF DRAWINGS

FIG. 1 is a block diagram illustrating an exemplary configuration of a display apparatus according to one embodiment of the present disclosure.

FIG. 2 is an explanatory diagram illustrating an example of an image observed in a display region of the display apparatus illustrated in FIG. 1.

FIG. 3 is an explanatory diagram illustrating an example of a relative positional relation between an observation target and the display apparatus.

FIG. 4 is an explanatory diagram illustrating another example of the image observed in the display region of the display apparatus illustrated in FIG. 1.

FIG. 5 is an explanatory diagram illustrating an exemplary operation of the display apparatus illustrated in FIG. 1.

FIG. 6 is another explanatory diagram illustrating an exemplary operation of the display apparatus illustrated in FIG. 1.

FIG. 7 is an explanatory diagram illustrating another exemplary operation of the display apparatus illustrated in FIG. 1.

FIG. 8 is another explanatory diagram illustrating another exemplary operation of the display apparatus illustrated in FIG. 1.

FIG. 9 is an explanatory diagram illustrating another example of the image observed in the display region of the display apparatus illustrated in FIG. 1.

FIG. 10 is an explanatory diagram illustrating an example of an image observed in a display region of a display apparatus according to a comparative example.

FIG. 11 is a block diagram illustrating an exemplary configuration of a display apparatus according to a modification example.

MODES FOR CARRYING OUT THE INVENTION

Hereinafter, some embodiments of the present disclosure are described in detail with reference to the drawings.

Embodiments

[Configuration Examples]

FIG. 1 illustrates an exemplary configuration of a display apparatus (display apparatus 1) according to an embodiment. The display apparatus 1 is configured to superimpose an image on an observation target such as an object or a person in the real space, and is applied to a smart glass, for example. It is to be noted that the application of the display apparatus 1 is not limited to this. The display apparatus 1 may be applied to a vehicle such as an automobile, for example. For instance, in case of the application to a vehicle, a transmissive display device (so-called see-through display) may be attached to the windshield of the vehicle, or an image may be projected on the windshield of the vehicle.

In this embodiment, the display apparatus 1 includes a so-called see-through display. The display apparatus 1 has a frame rate of 60 Hz, for example. The display apparatus 1 displays an object image $P_{obj}$ in the vicinity of the observation target in a display region D. The object image $P_{obj}$ includes information on the observation target present on the far side of the see-through display. That is, the observation target present in the real space and the object image $P_{obj}$ are superimposed on each other and observed by a user U of the display apparatus 1.

FIG. 2 illustrates an example of an image in the display region D of the display apparatus 1 observed by the user U. FIG. 2 includes a person A serving as the observation target and the object image $P_{obj}$. In this example, the person A is stationary on the far side of the display apparatus 1, and the user U observes the person A in the real space via the display apparatus 1. The display apparatus 1 starts drawing a plurality of line images L to be included in the object image $P_{obj}$ in order from the top at a position corresponding to the position (the position B1) of the person A. In this example, the object image $P_{obj}$ is arranged such that the lower left point P is located near the face of the person A. Thereby, the user U makes it possible to directly observe the observation target in the real space and recognize the information on the observation target.

Further, in a case where the position of the observation target in the display region D is changed by moving the display apparatus 1, for example, the display position of the object image $P_{obj}$ is adjusted on a pixel line basis in accordance with the change in position of the observation object.

FIG. 3 illustrates an example of a relative positional relation between the user U and the display apparatus 1 when the display apparatus 1 is moved. FIG. 4 illustrates an example of an image observed by the user U in the display region D of the display apparatus 1. In this example, as illustrated in FIG. 3, the user U of the display apparatus 1 moves rightward at a moving speed V together with the display apparatus 1. Although the user U moves in this example, it is to be noted that this example is a non-limiting example, and the same applies when the user moves the face in another direction. In this example, the moving speed V is a constant speed for convenience of explanation. Thus, in the image observed by the user U, the person A serving as the observation target moves leftward at a constant speed, as illustrated in FIG. 4. The display apparatus 1 adjusts the display position of the object image $P_{obj}$ on a pixel line basis in accordance with the change in position of the person A. Specifically, in this example, the display apparatus 1 starts drawing the plurality of line images L to be included in the object image $P_{obj}$ in order from the top when the person A is at the position B1. Then, the display apparatus 1 gradually shifts the drawing position of the line images L leftward in accordance with the movement of the person A from the position B1 to a position B2 in the display region D. As a result, the object image $P_{obj}$ is deformed and displayed such that a lower left point P1 is located more leftward than an upper left point O1. The lower left point P1 is located near the face of the person A. As a result, it is possible for the display apparatus 1 to reduce the possibility of making the user feel uncomfortable, as will be described later.

The display apparatus 1 includes an imaging unit 11, an image analyzer 12, an object generator 13, a memory 14, a drawing position calculator 15, an acceleration sensor 16, a display controller 20, and a display unit 17. The image analyzer 12, the object generator 13, the memory 14, the drawing position calculator 15, and the display controller 20 are configured by, for example, semiconductor circuitry. The processes of the display apparatus 1 may be implemented by hardware or software.

The imaging unit 11 is configured to generate a captured image by imaging an object, a person, or the like in the real space. For example, the imaging unit 11 includes a complementary metal oxide semiconductor (CMOS) image sensor.

The image analyzer 12 is configured to identify the observation target included in the captured image by performing an image analyzing process based on the captured image generated by the imaging unit 11, and generate information on the identified observation target. For example, the image analyzer 12 is adapted to generate the information on the identified observation target on the basis of data supplied from a server via the Internet, for example.

The object generator 13 is configured to generate the object image $P_{obj}$ including the information on the identified observation target on the basis of the result of the process performed by the image analyzer 12. Further, the object generator 13 is adapted to supply the generated object image $P_{obj}$ to the memory 14 and supply information on the size of the object image $P_{obj}$ (size information INFS) to the drawing position calculator 15.

The memory 14 is configured store the object image $P_{obj}$ generated by the object generator 13. The memory 14 includes, for example, a dynamic random access memory (DRAM) and a static random access memory (SRAM). The object image $P_{obj}$ stored in the memory 14 is read in response to an instruction from the display controller 20.

The drawing position calculator 15 is configured to generate information on the coordinates of the upper left point O of the object image $P_{obj}$ (origin information INFO) in the display region D of the display unit 17 on the basis of the result of the process by the image analyzer 12 and the size information INFS supplied from the object generator 13. Further, the drawing position calculator 15 is adapted to supply the origin information INFO and the size information INFS to the display controller 20.

The acceleration sensor 16 is configured to detect the acceleration rate of the display apparatus 1.

The display controller 20 is configured to read the object image $P_{obj}$ from the memory 14 and supply the read object image $P_{obj}$ to the display unit 17. The display controller 20 includes an offset calculator 21, a coordinate counter 22, a calculator 23, a register 24, and a reading unit 25.

The offset calculator 21 is configured to calculate the moving speed V of the display apparatus 1 on the basis of the result of detection by the acceleration sensor 16, and calculate an offset value OFS on the basis of the moving speed V. The display apparatus 1 is adapted to shift the plurality of line images L in the display region D in the horizontal direction on the basis of the offset value OFS.

The coordinate counter 22 is configured to generate coordinates x and y in the display region D of the display unit 17. As illustrated in FIG. 2, the coordinates of a upper left point is (0, 0), the coordinates of an upper right point is (X, 0), the coordinates of a lower left point is (0, Y), and the coordinates of a lower right coordinate is (X, Y) in the display region D of the display unit 17. The coordinate counter 22 generates the coordinates x and y on a pixel line basis from an upper left of the display region D of the display unit 17. Specifically, the coordinate counter 22 first generates the coordinates x and y including, in order from the left, (0, 0), (1, 0), (2, 0), . . . , (X, 0) on the uppermost pixel line in the display region D of the display unit 17. Next, the coordinate counter 22 generates the coordinates x and y including, in order from the left, (0, 1), (1, 1), (2, 1), . . . , (X, 1) on the next pixel line. The same applies thereafter.

The calculator 23 is configured to generate a coordinate x1 using the following expression on the basis of the offset value OFS generated by the offset calculator 21 and the coordinates x and y generated by the coordinate counter 22.

[Expression 1]

$$x1 = x - \sum_{y} OFS \qquad (EQ1)$$

Using the equation EQ1, the calculator 23 generates the coordinate x1 by integrating the offset values OFS within an allowable range of the coordinate y. In other words, the calculator 23 generates the coordinate x1 by integrating the moving speeds V within the allowable range of the coordinate y. The coordinates x1 and y are supplied to the reading unit 25.

The register 24 is configured to store the origin information INFO and the size information INFS.

In a case where the coordinates x1 and y are coordinates within a region indicated by the origin information INFO and the size information INFS, the reading unit 25 is configured to read image information on the object image $P_{obj}$ from the memory 14 on the basis of the coordinates x1 and y. Specifically, in a case where the coordinates x1 and y are within a region S indicated by the origin information INFO and the size information INFS, the reading unit 25 generates an address ADR based on the coordinates x1 and y. The memory 14 supplies the image information included in the object image $P_{obj}$ to be stored and corresponding to the address ADR to the reading unit 25 as data DATA. The reading unit 25 may designate the image information on a pixel basis, on a sub-pixel basis, or on multiple pixel basis using the address ADR. Further, the reading unit 25 is adapted to supply the read image information to the display unit 17 in the order of reading.

The display unit 17 is a transmissive display device (so-called see-through display), and is configured to display the object image $P_{obj}$ based on the image information on the object image $P_{obj}$ read by the reading unit 25.

Here, the display unit 17 corresponds to a specific example of a "display unit" of the present disclosure. The display controller 20 corresponds to a specific example of a "display controller" of the present disclosure. The acceleration sensor 16 corresponds to a specific example of an "acceleration sensor" of the present disclosure. The memory 14 corresponds to a specific example of a "first memory" in the present disclosure.

[Operation and Workings]

Next, the operation and workings of the display apparatus 1 of the present embodiment are described.

(Outline of Overall Operation)

First, referring to FIG. 1, the outline of an overall operation of the display apparatus 1 is described. The imaging unit 11 generates a captured image by imaging an object or a person in the real space. The image analyzer 12 identifies an observation target included in the captured image by performing an image analyzing process based on the captured image generated by the imaging unit 11, and generates information on the identified observation target. The object generator 13 generates an object image $P_{obj}$ including the information on the specified observation target on the basis of the result of the process performed by the image analyzer 12. The memory 14 stores the object image $P_{obj}$ generated by the object generator 13. The drawing position calculator 15 generates information (origin information INFO) on the coordinates of the upper left point O of the object image $P_{obj}$ in the display region D of the display unit 17 on the basis of the result of the process by the image analyzer 12 and the size information INFS supplied from the object generator 13. Then, the drawing position calculator 15 supplies the origin information INFO and the size information INFS to the display controller 20.

The acceleration sensor 16 detects the acceleration rate of the display apparatus 1. The offset calculator 21 of the display controller 20 calculates the moving speed V of display apparatus 1 on the basis of the result of detection by the acceleration sensor 16, and calculates the offset value OFS based on the moving speed V. The coordinate counter 22 generates the coordinates x and y in the display region D of the display unit 17. The calculator 23 generates the coordinate x1 based on the offset value OFS generated by the offset calculator 21 and the coordinates x and y generated by the coordinate counter 22. The register 24 is configured to store the origin information INFO and the size information INFS. The reading unit 25 reads the image information on the object image $P_{obj}$ from the memory 14 on the basis of the coordinates x1, y in a case where the coordinates x1 and y are within the region S indicated by the origin information INFO and the size information INFS. The display unit 17 displays the object image $P_{obj}$ based on the image information on the object image $P_{obj}$ read by the reading unit 25.

(Detailed Operation)

The operation of the display controller 20 will now be described in detail by way of several examples.

In a case where the display apparatus 1 is moved rightward at a constant speed as illustrated in FIG. 3, the person A serving as the observation target moves leftward at the constant speed as illustrated in FIG. 4. In this case, the offset value OFS is set to a negative value corresponding to the constant speed. Using the equation EQ1, the calculator 23 generates the coordinate x1 on the basis of the coordinates x and y. Since the offset value OFS is a negative value in this example, the coordinate x1 is set to a value larger than the coordinate x.

FIGS. 5 and 6 illustrate an exemplary operation of the displaying controller 20. In FIG. 5, a region R1 is a coordinate region represented by the coordinates x and y, and a region R2 is a coordinate region represented by the coordinates x1 and y. That is, in this example, the value of the coordinate x1 becomes larger and the region R2 shifts rightward as the value of the coordinate y increases.

In a case where the coordinates x1 and y are coordinates within the region S indicated by the origin information INFO and the size information INFS, the reading unit 25 generates the address ADR corresponding to the coordinates x1 and y, and reads the image information corresponding to the address ADR from the memory 14. Specifically, for example, in a case where the coordinates x1 and y are the coordinates of the point O, the reading unit 25 reads the image information at the point O from the memory 14. In this manner, the reading unit 25 sequentially reads the image information on the plurality of line images L included in the object image $P_{obj}$ from the memory 14.

Since the coordinates defining the region R1 are converted into the coordinates defining the region R2 as described above, a horizontal distance W2 from a left end of the region R2 to the point O is shorter than a horizontal distance W1 from a left end of the region R1 to the point O. Therefore, the reading unit 25 reads the image information at the point O at an earlier timing. Likewise, a horizontal distance W4 from the left end of the region R2 to the lower left point P of the region S is shorter than a horizontal distance W3 from the left end of the region R1 to the point P. Therefore, the reading unit 25 reads the image information at the point P at an earlier timing.

Accordingly, in this example, the drawing position of the line images L gradually shifts leftward as the coordinate y increases, as illustrated in FIG. 6. Specifically, in the display region D of the display unit 17, the upper left point O1 of the object image $P_{obj}$ is arranged at a position distant from the left end by the distance W2, and the lower left point P1 of the object image $P_{obj}$ is arranged at a position distant from the left end by the distance W4. As a result, in this example, the shape of the object image $P_{obj}$ changes from the original rectangular shape into a parallelogram shape in this example. In this manner, the display apparatus 1 adjusts the display position of the object image $P_{obj}$ on a pixel line basis by shifting the line images L in the horizontal direction. As a result, as illustrated in FIG. 4, the object image $P_{obj}$ is arranged such that the lower left point P1 is located near the face of the person A.

Furthermore, if the display apparatus 1 starts moving rightward in the middle of a frame period, for example, the person A serving as the observation target starts moving leftward in the display region D of the image observed by the user U in the middle of the frame period, as illustrated in FIG. 4. In this case, the offset value OFS is "0" (zero) until the middle of the frame period, and is set to a negative value corresponding to the moving speed after the middle of the frame period. The calculator 23 generates the coordinate x1 on the basis of the coordinates x and y using the equation EQ1.

FIGS. 7 and 8 illustrate an exemplary operation of the display controller 20. In this example, the display apparatus 1 starts moving in the middle of the frame period, as illustrated in FIG. 7. Thus, the coordinate x1 becomes larger than the coordinate x from the middle of the frame period, and the region R2 shifts rightward. In this example, a horizontal distance W6 from the left end of the region R2 to the point O of the region S is the same as a horizontal distance W5 from the left end of the region R1 to the point O of the region S. In contrast, a horizontal distance W8 from the left end of the region R2 to the lower left point P of the region S is shorter than a horizontal distance W7 from the left end of the region R1 to the point P. Therefore, the reading unit 25 reads the image information at the point P at an earlier timing.

Accordingly, as illustrated in FIG. 8, the upper left point O1 of the object image $P_{obj}$ is arranged at a position distant from the left end by the distance W6, and the lower left point P1 of the object image $P_{obj}$ is arranged at a position distant from the left end by the distance W8 in the display region D of the display unit 17. As a result, in this example, the shape of the object-image $P_{obj}$ changes from the original rectangular shape. In this manner, the display apparatus 1 adjusts the display position of the object image $P_{obj}$ on a pixel line basis by shifting the line image L in the horizontal direction. As a result, as illustrated in FIG. 9, the object image $P_{obj}$ is arranged such that the lower left point P1 is located near the face of the person A.

As described above, the display apparatus 1 adjusts the displayed position of the object-image $P_{obj}$ on a pixel line basis. Specifically, the display apparatus 1 adjusts the displayed position of the line image L while maintaining the relative positional relation in the horizontal direction between the observation target and the line images L included in the object image $P_{obj}$ in the display region D. Accordingly, it is possible for the display apparatus 1 to reduce the possibility of making the user U feel uncomfortable when the user U moves the face in another direction, for example.

That is, for example, in a case where the display position of the object image $P_{obj}$ is not adjusted on a pixel line basis unlike the embodiment described above, the relative positional relation between the observation target and the object image $P_{obj}$ changes as the observation target moves in the display region D. That is, in this case, when the person A moves leftward after the drawing of the object image $P_{obj}$ starts at the position corresponding to the position B1 of the person A serving as the observation target as illustrated in FIG. 10, for example, the object image $P_{obj}$ continues to be drawn at the same position, as illustrated in FIG. 10. Thus, the person A moves away from the object image $P_{obj}$ for a time. Then, in the next frame, drawing of the object image $P_{obj}$ is started at a position corresponding to the position of the person A (e.g., the position B2) at that time. Then, when the person A moves further leftward, the object image $P_{obj}$ continues to be drawn at the same position. Thus the person A moves away from the object image $P_{obj}$ for a time. Then, in the next frame, drawing of the object image $P_{obj}$ is started at a position corresponding to the position of the person A at that time. In this manner, the person A and the object image $P_{obj}$ repeatedly come closer to each other and separate from each other. This may make the user U feel uncomfortable.

In contrast, the display apparatus 1 adjusts the display position of the object image $P_{obj}$ on a pixel line unit. This makes it possible to keep the person A and the object-image $P_{obj}$ closer to each other as illustrated in FIG. 4. As a result, it is possible for the display apparatus 1 to reduce the possibility of making the user U feel uncomfortable.

[Effect]

According to the present embodiment described above, the display position of the object image is adjusted on a pixel line basis. Therefore, it is possible to reduce the possibility of making the user feel uncomfortable.

[Modification 1]

Although the calculator 23 converts the coordinate x into the coordinate x1, and the reading unit 25 reads the object image $P_{obj}$ from the memory 14 on the basis of the coordinates x1 and y in the embodiment described above, this is a non-limiting example. Hereinafter, a modification example of the present disclosure is described in detail.

FIG. 11 illustrates an exemplary configuration of a display apparatus 2 according to the modification example. The display apparatus 2 includes a display controller 30. The display controller 30 includes a reading unit 35, a calculator 36, and a line memory 37.

In a case where the coordinates x and y are coordinates within the region indicated by the origin information INFO and the size information INFS, the reading unit 35 is configured to read the image information on the object image $P_{obj}$ from the memory 14 on the basis of the coordinates x and y. Specifically, in a case where the coordinates x and y are within the region S indicated by the origin information INFO and the size information INFS, the reading unit 35 generates an address ADR based on the coordinates x and y. The memory 14 supplies the image information included in the object image $P_{obj}$ to be stored and corresponding to the address ADR to the reading unit 35 as data DATA. Further, the reading unit 35 is adapted to supply the read image information to the line memory 37 in the order of reading.

The calculator 36 is configured to generate a coordinate x2 using the following equation on the basis of the offset value OFS generated by the offset calculator 21 and the coordinate y generated by the coordinate counter 22. [Expression 2]

$$x2 = \sum_y OFS \qquad (EQ2)$$

The coordinate x2 is then supplied to the line memory 37.

The line memory 37 is configured to store image information on two lines, for example. The line memory 37 is adapted to temporarily store the image information supplied from the reading unit 35, read the stored image information based on the coordinate x2, and supply the read image information to the display unit 17 in the order of reading.

Here, the display controller 30 corresponds to a specific example of the "display controller" of the present disclosure. The line memory 37 corresponds to a specific example of a "second memory" of the present disclosure.

In a case where the display apparatus 1 is moved rightward at a constant rate as illustrated in FIG. 3, for example, the person A serving as the observation target moves leftward at the constant speed in the image observed by user U, as illustrated in FIG. 4. In this case, the offset value OFS is set to a negative value corresponding to the constant speed. Using the equation EQ2, the calculator 36 generates the coordinate x2 on the basis of the coordinate y. Since the offset value OFS is a negative value in this example, the coordinate x2 is also set to a negative value. When the coordinate x2 is set to a negative value, the line memory 37 reads the image information at an earlier timing and supplies the read image information to the display unit 17. This causes the drawing position of the line image L to shift leftward as illustrated in FIG. 6, for example.

Although the present technology has been described with reference to the embodiments and the modification example, the present technology is not limited to these embodiments and the like, and various modifications may be made.

For example, although one object image $P_{obj}$ is displayed in each of the above-described embodiments, this is a non-limiting example. A plurality of object images $P_{obj}$ may be displayed.

It is to be noted that the effects described herein are merely illustrative and not restrictive, and other effects may be present.

The present technology may be configured as follows. According to the configuration of the present technology described below, it is possible to reduce the possibility of making the user feel uncomfortable.

(1) A display apparatus including:
   a display unit configured to superimpose an image on an observation target and to display an object image; and
   a display controller configured to adjust a display position of the object image in a display region of the display unit in a horizontal direction on a pixel line basis.

(2) The display apparatus according to (1) described above, in which
   the display controller is configured to adjust the display position on the pixel line basis while maintaining a relative positional relation in the horizontal direction between the observation target in the display region and a line image included in the object image.

(3) The display apparatus according to (2) described above, further including
   a sensor configured to detect movement of the display apparatus and to generate movement information on a basis of a detection result, in which
   the display controller is configured to adjust the display position of the object image on the pixel line basis by adjusting a position at which the line image is to be displayed on a basis of the movement information.

(4) The display apparatus according to (3) described above, in which
   the display controller is configured to
   calculate a speed of the observation target in the display region in the horizontal direction on a basis of the movement information, and
   adjust the position at which the line image is to be displayed on a basis of the speed.

(5) The display apparatus according to (4) described above, in which
   the display controller is configured to
   perform integration of the speed on the pixel line basis, and
   adjust the position at which the line image is to be displayed on a basis of a result of the integration.

(6) The display apparatus according to any one of (3) to (5) described above, further including
   a first memory configured to store the object image, in which
   the display controller is configured to
   generate a first coordinate indicating a horizontal coordinate and a second coordinate indicating a vertical coordinate,
   correct the first coordinate on a basis of the movement information, the first coordinate, and the second coordinate,
   read the object image from the first memory on a basis of the second coordinate and the corrected first coordinate, and
   supply the read object image to the display unit.

(7) The display apparatus according to any one of (3) to (5) described above, further including
   a first memory configured to store the object image, in which
   the display controller is configured to
   adjust, on a basis of the movement information, a reading timing of reading the line image included in the object image from the first memory, and
   supply the read line image to the display unit.

(8) The display apparatus according to (3) to (5) described above, in which
   the display controller includes a second memory configured to store one or more of the line images included in the object image, and is configured to
   generate a first coordinate indicating a horizontal coordinate and a second coordinate indicating a vertical coordinate,
   read the line image from the second memory on a basis of the movement information and the second coordinate, and
   supply the read line image to the display unit.

(9) The display apparatus according to (3) to (5) described above, in which
   the display controller includes a second memory configured to store one or more of the line images included in the object image, and is configured to
   adjust, on a basis of the movement information, a reading timing of reading the line image from the second memory, and
   supply the read line image to the display unit.

(10) A display control apparatus including
   a display controller configured to adjust a display position of an object image displayed in a display region of a display unit in a horizontal direction on a pixel line basis, the display unit being configured to superimpose an image on an observation target.

The present application claims priority based on Japanese Patent Application No. 2018-222345 filed with the Japan Patent Office on Nov. 28, 2018, the entire contents of which are incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:

1. A display apparatus, comprising:
a display unit configured to superimpose an object image on an observation target in a display region, wherein the object image includes a line image; and
a display controller configured to:
calculate a speed of the observation target in the display region in a horizontal direction;
execute integration of the speed on a pixel line basis; and
adjust a display position of the line image on the display region based on the execution of the integration, wherein
the display position of the line image is adjusted to adjust a display position of the object image in the display region in the horizontal direction,
the object image includes:
an upper left point at a first distance from an end of the display region; and
a lower left point at a second distance from the end of the display region, and
the first distance is greater than the second distance after the adjustment of the display position of the line image.

2. The display apparatus according to claim 1, wherein the display controller is further configured to adjust the display position of the object image on the pixel line basis while maintaining a relative positional relation in the horizontal direction between the observation target in the display region and the line image.

3. The display apparatus according to claim 2, further comprising a sensor configured to:
detect movement of the display apparatus to obtain a detection result; and
generate movement information based on the detection result, wherein
the display controller is further configured to adjust the display position of the line image based on the movement information.

4. The display apparatus according to claim 3, wherein the display controller is further configured to calculate the speed of the observation target in the display region in the horizontal direction based on the movement information.

5. The display apparatus according to claim 3, further comprising a first memory configured to store the object image, wherein
the display controller is further configured to:
generate each of a first coordinate indicating a horizontal coordinate and a second coordinate indicating a vertical coordinate
correct the first coordinate based on the movement information, the first coordinate, and the second coordinate
read the object image from the first memory based on the second coordinate and the corrected first coordinate and
supply the read object image to the display unit.

6. The display apparatus according to claim 3, further comprising a first memory configured to store the object image, wherein
the display controller is further configured to:
adjust, based on the movement information, a reading timing to read the line image in the object image from the first memory, and
supply the read line image to the display unit.

7. The display apparatus according to claim 3, wherein the object image includes a plurality of line images, the plurality of line images includes the line image, the display controller includes a second memory configured to store at least one line image of the plurality of line images in the object image, and
the display controller is further configured to
generate each of a first coordinate indicating a horizontal coordinate and a second coordinate indicating a vertical coordinate
read the line image from the second memory based on the movement information and the second coordinate and
supply the read line image to the display unit.

8. The display apparatus according to claim 3, wherein the object image includes a plurality of line images, the plurality of line images includes the line image, the display controller comprises a second memory, the second memory is configured to store at least one line image of the plurality of line images in the object image, and
the display controller is further configured to:
adjust, based on the movement information, a reading timing to read the line image from the second memory; and
supply the read line image to the display unit.

9. A display control apparatus, comprising:
a display controller configured to:
calculate a speed of an observation target in a horizontal direction in a display region of a display unit, wherein
the display unit superimposes an object image on the observation target, and
the object image includes a line image;
execute integration of the speed on a pixel line basis; and
adjust a display position of the line image on the display region based on the execution of the integration, wherein
the display position of the line image is adjusted to adjust a display position of the object image in the display region in the horizontal direction,
the object image includes:
an upper left point at a first distance from an end of the display region, and
a lower left point at a second distance from the end of the display region, and
the first distance is greater than the second distance after the adjustment of the display position of the line image.

* * * * *